Jan. 8, 1935.  M. F. WARD  1,987,172
MEAT CUTTER
Filed Aug. 21, 1933

Inventor:
Michael F. Ward
By Casper L. Redfield
Atty.

Patented Jan. 8, 1935

1,987,172

UNITED STATES PATENT OFFICE 1,987,172

MEAT CUTTER

Michael F. Ward, Chicago, Ill.

Application August 21, 1933, Serial No. 686,023

3 Claims. (Cl. 146—189)

My invention relates to meat cutters, and has for its object improvements in such devices. More particularly, the improvements relate to the perforated plate in its relationship to the other parts of the machine.

In the accompanying drawing

Figure 4:
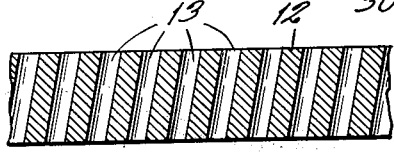
Fig. 4 is an enlarged partial section on line 4—4 of Fig. 2.

The case 10 of the machine is of the ordinary form, and the same may be said of the feed screw 11. The perforated plate 12 is also of ordinary size and form except as will be set forth hereinafter. It has inclined perforations as shown at 13 in Fig. 4, and its outer edge is located in a recess 14 in the casing 10. A nut 15 screwed on the case and bearing against the outer face of the plate serves to force it inward, as may be required. A recess 16 (Fig. 1) in the outer edge of the plate engages a projection or pin (not shown) in the recess 14 of the casing to prevent the plate from turning therein.

Secured in the end of the feed screw 11 is a stud 17, which stud may be considered as being an axial extension of the screw 11. On the stud 17, and adjacent to the screw 11, is a collar 18 on which is mounted a spider 19 having arms which carry knives 20. These parts are of ordinary construction and need no particular description.

The part of the stud 17 which extends beyond the collar 18 has a longitudinal keyway 21 cut therein, and on this stud is a sleeve 22 having a pin or key 23 which projects into the keyway. The result of this construction is that the sleeve 22 is driven rotatively by the screw 11 thru its extension 17, and may slide longitudinally on said extension. As will be explained hereinafter, the sleeve may be withdrawn from the stud 17, may be turned end for end, and then may be replaced upon the stud in reversed position.

Mounted upon the sleeve is a ring or collar 24 which is freely movable longitudinally and rotatively on the sleeve. To limit the longitudinal movement of one of these parts with respect to the other, the sleeve is provided with flanges 25 at its ends. One of these flanges is a separate piece to permit the ring to be placed upon the sleeve. This separate piece is then secured in place by press fit, by riveting or otherwise.

While the sleeve and ring are freely movable with respect to each other at all positions between the flanges 25, there are reasons for holding the ring or collar 24 yieldingly at certain positions on the sleeve. These positions are adjacent to the flanges 25. To accomplish this a recess is formed in the inner face of the ring, and in this recess is a small ball 26 with a spring 27 back of it acting to force the ball out of the recess.

At points 28, near flanges 25, are small recesses cut in the outer surface of the sleeve. These recesses are of such size and depth that they will permit each to receive slightly less than one-half of the ball 26. When the ring is moved to a position in which the ball 26 enters one of the recesses 28, the ball forms a yieldable driving connection from the sleeve to the ring. Or the construction may be defined as a yielding catch between the sleeve and ring. It will be understood that this yielding catch operates the same at both ends of the sleeve.

The central part of the plate 12 is bored out so that it forms an easy or slightly loose fit over the ring 24, and at the axial or longitudinal centers of plate and ring is cut a raceway for balls 30. To make it possible to get these balls into their raceway, a hole, slightly larger in diameter than the balls 30, is drilled radially at one place thru the ring, and this hole is filled by a plug 31 secured in place by a dowel pin 32. This is done before the raceway is cut. After the raceway is cut, the plug 31 is removed, and the ring and plate are assembled in their relative positions. In this condition, the raceway is filled by passing balls thru the radial hole in the ring, and the plug is returned to position. The sleeve 22 is then inserted in the ring. At the time of such insertion, the spring 27 and ball 26 are inserted in their recess. After the completion of such assembling, the separate flange is secured in place.

Figure 3:
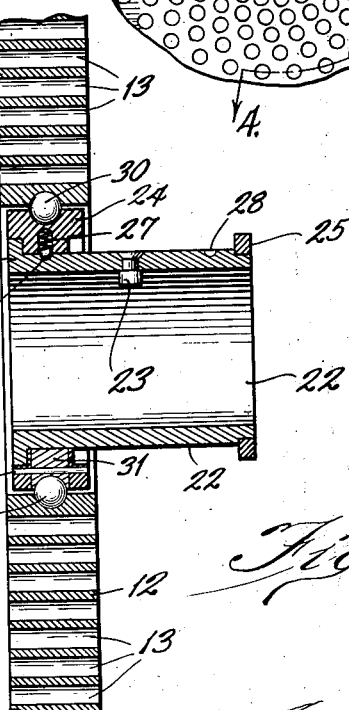
Fig. 3 is an enlarged section of the central parts of Fig. 1, parts being in elevation.

In this assembled condition, the plate 12, the ring or collar 24 and the sleeve 22 are three parts which are secured together and are movable with respect to each other within prescribed limits. The ring can turn freely within the plate, but the balls act to restrain any axial or longitudinal movement of one with respect to the other. In the position shown in Fig. 3, a rotation of the sleeve causes a similar rotation of the ring 24 by reason of the ball 26 being in the adjacent recess 28. But, because of the shallowness of the recess 28, a longitudinal pressure on the sleeve toward the left will cause it to move until the ball 26 rests in the other recess 28. If the assembled parts then be turned end for end, they will occupy the same relative positions as before, but with the opposite face of the plate adjacent to the knives 20.

Figure 1:
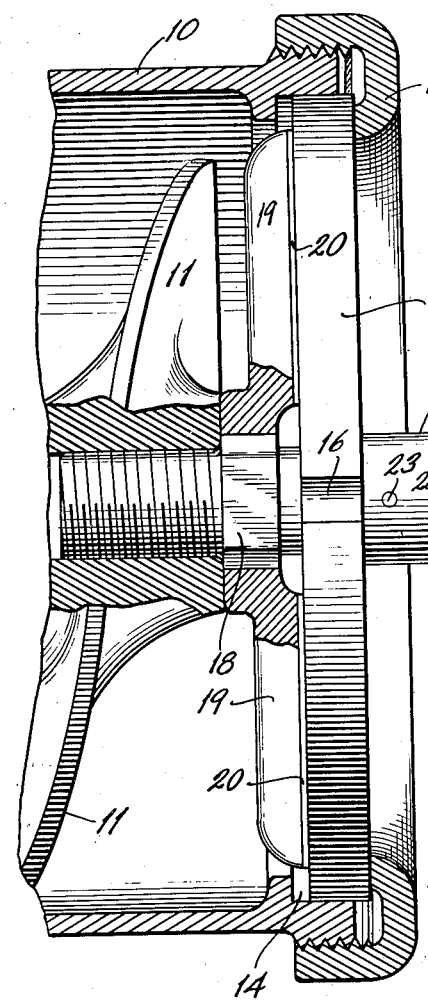
Fig. 1 is a longitudinal section thru the discharge end of a meat cutter, parts being in elevation.
Figure 2:
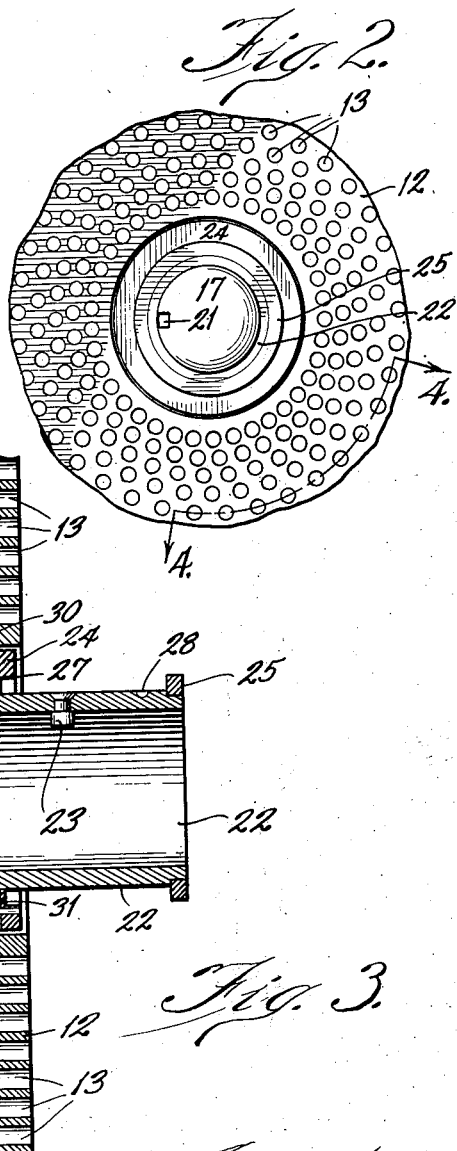
Fig. 2 is a face elevation of the central part of Fig. 1.

Assuming the parts to be in the position shown in Fig. 1, an operator may remove the nut 15, and then by seizing the sleeve by hand, he may withdraw the plate from the recess 14 in the case. Then, by reversing the parts and placing the sleeve again on the stud, he will have the parts in the same position as before, but with the reverse side of the plate to the knives 20.

It is to be observed that there is no nut or other securing device on the stud 17, and that the assembled parts are adjusted on the stud and toward the knives by the nut which holds the plate to the case.

What I claim is:

1. The combination with the case and feed screw of a meat cutter, of a stud secured to the feed screw and moving therewith, a sleeve mounted upon said stud and driven thereby, a collar mounted upon and moving with the sleeve, a perforated plate mounted upon the collar and held against rotation by the case, a ball bearing between the plate and the collar, knives carried by the stud, and a nut engaging the case and serving to press the plate against the knives.

2. The combination with the case and feed screw of a meat cutter, of a sleeve arranged to slide on an extension of the feed screw and be driven thereby, a collar longitudinally adjustable on the sleeve and driven thereby, a plate supported in the case and having a central opening to receive the collar, a ball bearing for the feed screw and located between the collar and the plate, and means to move the sleeve, plate and ball bearing longitudinally with respect to the case and the feed screw.

3. In a meat cutter, a case, a plate held by the case, a feed screw having a bearing at the center of the plate, a slidable sleeve between the plate and the axis of the screw and driven rotatively by the screw, a catch by which the sleeve is held yieldingly at a plurality of positions with respect to the plate, and means by which said sleeve serves as a handle in removing the plate and reversing it with respect to the screw.

MICHAEL F. WARD.